(12) United States Patent
Bolshinsky et al.

(10) Patent No.: US 10,319,048 B2
(45) Date of Patent: *Jun. 11, 2019

(54) CALCULATING EXPERTISE CONFIDENCE BASED ON CONTENT AND SOCIAL PROXIMITY

(71) Applicant: International Business Machines Corporation, Armonk, NY (US)

(72) Inventors: Leonid Bolshinsky, Karmiel (IL); Inbal Ronen, Haifa (IL); Eitan Shapiro, Haifa (IL); Arnon Yogev, Misgav (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 918 days.

This patent is subject to a terminal disclaimer.

(21) Appl. No.: 14/837,770

(22) Filed: Aug. 27, 2015

(65) Prior Publication Data

US 2016/0179810 A1 Jun. 23, 2016

Related U.S. Application Data

(63) Continuation of application No. 14/573,561, filed on Dec. 17, 2014, now Pat. No. 10,146,839.

(51) Int. Cl.
*G06F 16/00* (2019.01)
*G06Q 50/00* (2012.01)
(Continued)

(52) U.S. Cl.
CPC ............ *G06Q 50/01* (2013.01); *G06F 16/33* (2019.01); *G06F 16/951* (2019.01)

(58) Field of Classification Search
None
See application file for complete search history.

(56) References Cited

U.S. PATENT DOCUMENTS 7,124,353 B2 10/2006 Goodwin et al.
8,415,135 B2 4/2013 Lin
(Continued)

OTHER PUBLICATIONS

Balog, K. et al., "Expertise Retrieval," In Foundations and Trends in Information Retrieval, vol. 6, Nos. 2-3 (2012) pp. 127-256, retrieved from the Internet: <https://www.cs.purdue.edu/homes/lsi/FNTIR_2012.pdf>.

(Continued)

*Primary Examiner* — Son T Hoang
(74) *Attorney, Agent, or Firm* — Cuenot, Forsythe & Kim, LLC

(57) ABSTRACT

A method includes executing, via a processor, a document-oriented search based on a query in an index of documents to generate a set of document results, each document associated with at least one potential expert. The method includes analyzing the document results to produce a list of potential experts. The method includes calculating an expertise score for each potential expert based on a calculated content score and metadata score for each potential expert. The method includes calculating an evidence diversity score for each potential expert. The method includes calculating a confidence score for each potential expert based on a diversity-constrained content score and a diversity-constrained metadata score for each potential expert. The method includes displaying a list of potential experts with associated confidence scores.

7 Claims, 8 Drawing Sheets

(51) Int. Cl.
*G06F 16/951* (2019.01)
*G06F 16/33* (2019.01)

(56) References Cited

U.S. PATENT DOCUMENTS

| | | | |
|---|---|---|---|
| 8,745,135 B2 | 6/2014 | Chen et al. | |
| 2010/0262610 A1* | 10/2010 | Acosta | G06F 17/30663 707/748 |
| 2012/0310928 A1 | 12/2012 | Ray et al. | |
| 2012/0313948 A1* | 12/2012 | Bergman | G06Q 10/101 345/440 |
| 2013/0007009 A1 | 1/2013 | Caldwell et al. | |
| 2013/0007121 A1* | 1/2013 | Fontenot | G06Q 10/101 709/204 |
| 2014/0108325 A1 | 4/2014 | Flinn et al. | |
| 2015/0046443 A1 | 2/2015 | Barkai et al. | |
| 2016/0179805 A1 | 6/2016 | Bolshinsky et al. | |

OTHER PUBLICATIONS

Hochmeister, M., "Measuring User Expertise in Online Communities," Thesis, Vienna Univ. of Technology, Institute of Software Technology and Interactive Systems, May 2012, retrieved from the Internet: <http://www.ec.tuwien.ac.at/~dorn/Thesis/Dissertations/Hochmeister.pdf>, 171 pg.

Lin, C.L. et al., "SmallBlue: Social Network Analysis for Expertise Search and Collective Intelligence," In IEEE 25th Int'l. Conf. on Data Engineering (ICDE'09), pp. 1483-1486. IEEE, 2009, retrieved from the Internet: <http://www.cs.ucsb.edu/~xyan/papers/icde09_smallblue.pdf>.

Maybury, M.T., "Expert Finding Systems," MITRE Center for Integrated Intelligence Systems, Technical Report MTR 06B000040, Sep. 2006, retrieved from the Internet: <http://www.mitre.org/sites/default/files/pdf/06_1115.pdf>, 64 pg.

Balog, K. et al., "Determining Expert Profiles (With an Application to Expert Finding)," In 20th Int'l. Joint Conf. on Artificial Intelligence (IJCAI '07), vol. 7, pp. 2657-2662, Jan. 2007, retrieved from the Internet: <http://www.aaai.org/Papers/IJCAI/2007/IJCA107-427.pdf>.

Mel, P. et al., "The NIST Definition of Cloud Computing," [online] National Institute of Standards and Technology, US Dept. of Commerce, Special Publication 800-145, <http://csrc.nist.gov/publications/nistpubs/800-145/SP800-145.pdf>, 7 pg.

U.S. Appl. No. 14/837,770, filed Aug. 27, 2015.
U.S. Appl. No. 14/573,561, filed Dec. 17, 2014.
IBM: List of IBM Patents or Patent Applications Treated as Related (Appendix P), 2 pg.
Bolshinsky et al., "Calculating Expertise Confidence Based on Content and Social Proximity," U.S. Appl. No. 14/573,561, filed Dec. 17, 2014, 41 pages.

* cited by examiner

300

CALCULATING EXPERTISE CONFIDENCE BASED ON CONTENT AND SOCIAL PROXIMITY

CROSS-REFERENCE TO RELATED APPLICATIONS

This application is a Continuation of U.S. Application Ser. No. 14/573,561, filed on Dec. 17, 2014, the entirety of which is incorporated herein by reference.

BACKGROUND

The present techniques relate to calculating expertise confidence, and more specifically, to calculating expertise confidence based on content and social proximity.

SUMMARY

According to an embodiment described herein, a system can include a processor. The processor can execute a document-oriented search based on a query in an index of documents to generate a set of document results, each document associated with at least one potential expert. The processor can also analyze the document results to produce a list of potential experts. The processor can also further calculate an expertise score for each potential expert based on a content score and a metadata score for each potential expert. The processor can further calculate a confidence score for each potential expert based on a diversity-constrained content score and a diversity-constrained metadata score for each potential expert. The diversity-constrained content score and the diversity-constrained metadata score can be calculated using an evidence diversity score for each potential expert. The processor can also further send a list of experts with associated confidence scores that are above a confidence score threshold to a client device.

According to another embodiment described herein, a method can include executing, via a processor, a document-oriented search based on a query in an index of documents to generate a set of document results, each document associated with at least one potential expert. The method can include analyzing, via the processor, the document results to produce a list of potential experts. The method can also include calculating, via the processor, an expertise score for each potential expert based on a calculated content score and metadata score for each potential expert. The method can further include calculating, via the processor, an evidence diversity score for each potential expert. The method can also further include calculating, via the processor, a confidence score for each potential expert based on a diversity-constrained content score and a diversity-constrained metadata score for each potential expert, the diversity-constrained content score and the diversity-constrained metadata score to be calculated using the evidence diversity score for each potential expert. The method can also include displaying a list of potential experts with associated confidence scores.

According to another embodiment described herein, a computer program product for calculating confidence scores can include computer-readable storage medium having program code embodied therewith. The computer readable storage medium is not a transitory signal per se. The program code can be executable by a processor to cause the processor to execute, via the processor, a document-oriented search based on a query in an index of documents to generate a set of document results, each associated with at least one potential expert. The program code can also cause the processor to analyze, via the processor, the document results to produce a list of potential experts. The program code can also cause the processor to calculate, via the processor, an expertise score for each potential expert based on a calculated content score and metadata score for each potential expert and sorting the potential experts by the expertise score. The program code can also cause the processor to select, via the processor, a predetermined number of potential experts with higher expertise scores from the list of potential experts. The program code can also cause the processor to calculate, via the processor, an evidence diversity score for each selected expert. The program code can also cause the processor to calculate, via the processor, a confidence score for the selected experts based on at least one of a diversity-constrained content score, a diversity-constrained metadata score, and a social score, the diversity-constrained content score and the diversity-constrained metadata score to be calculated using the evidence diversity score and the social score for each expert to be based on a number of connections to other selected experts. The program code can also cause the processor to filter, via the processor, the selected experts by the confidence score.

DETAILED DESCRIPTION

Figure 1:
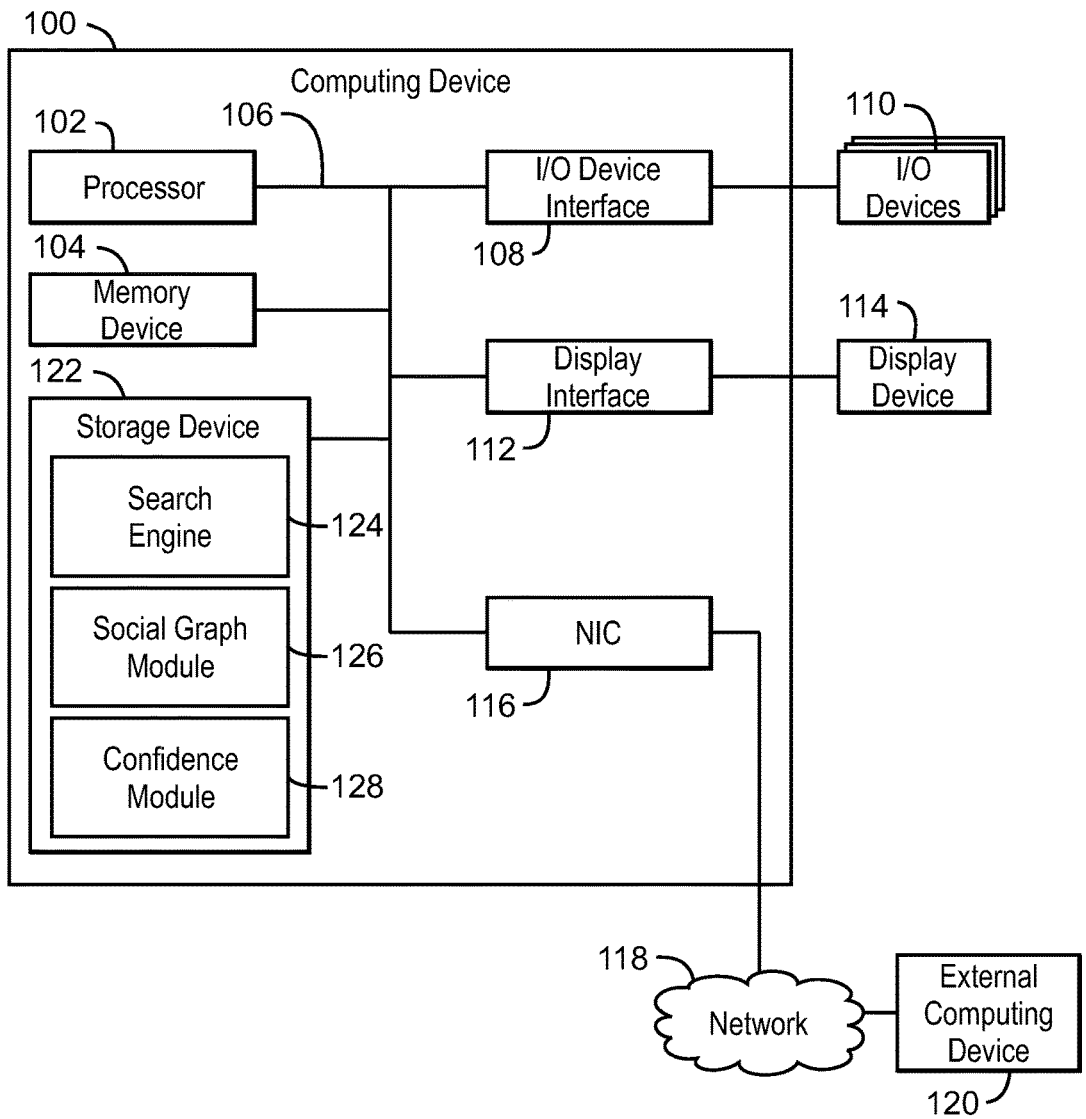
FIG. 1 is block diagram of an example computing device that can query expertise.

As a growing number of users are connected by websites and software, identifying a number of users that have expertise in a certain skillset can be challenging. For example, some social networking websites may have many users that might be experts in one or more areas. Some systems that analyze social networking websites and software may rely on users to provide information indicating areas of expertise, which may include an approval process that validates the user's expertise. Other systems are based on endorsements of skill sets, wherein uses are encouraged to endorse other people on the social network with certain skills and/or areas of expertise. For example, a level of confidence in the expertise of a person can be based on how many users have endorsed the person for a given skill or area of expertise. However, such endorsements may not be thoroughly evaluated or validated and the endorsements may not be based on any evidence of knowledge in the particular area of expertise. Moreover, skill sets can change over a career. For example, a person may have one expertise at one point in time and another a few years later. Additionally, a fan of an area of expertise can produce a lot of content on an area of expertise but may not be an expert in the area.

Also, a person may have more evidence of expertise than any other person, but the amount of data available in the area upon which the evidence is based on may be rather limited. Therefore, simply returning a relative expert based upon a small amount of available evidence may not be enough information to make an informed decision in choosing an expert from a list of experts.

According to embodiments of the present disclosure, a confidence score can be calculated for potential experts in a network for a plurality of areas of expertise based on content evidence. A confidence score of a person's expertise may be used to indicate the relative level of certainty of whether a person is actually an expert. A potential expert, as used herein, refers to a person that exhibits practice in an area of expertise through for example creation, tagging, commenting or reading of content and may be an expert in the area. In some examples, the confidence score can be based on both the amount of evidence as well as the diversity of the evidence. For example, diverse evidence can have many different types of a particular dimension of evidence. Content evidence can be diverse if it includes many types of content documents and/or associations with an expert. Metadata evidence can be diverse if it includes many types of metadata in connection with an expert. Metadata refers to a list of characteristics describing an expert. In some examples, the content evidence and metadata evidence can be combined with a score based on social graph analytics for calculating a confidence score. For example, the social score can be used to determine the number of other experts in an area of expertise that are connected to a particular expert. An expertise score based on content evidence and metadata evidence can be used to rank experts based on the expertise score for a given expertise. In some examples, a list of ranked experts can be provided in response to a query for a given expertise along with the confidence score for that expertise. Thus, embodiments of the present disclosure allow potential experts in a network, such as a social network, to be identified and ranked based on verifiable content or data. Additionally, the confidence of the ranking system can be improved by the inclusion of additional dimensions of evidence such as social proximity to other experts in the same area of expertise, among other dimensions. A dimension is any suitable characteristic that can be used to improve confidence. Thus, the system can effectively distinguish between "fans" of areas of expertise that may repost content generated from experts and the experts that actually practice the expertise. The addition of other dimensions provides a wider perspective and an efficient approach for calculating a confidence score for each expert. In some examples, the confidence score can be used to filter a list of experts based on a threshold level of confidence.

In some scenarios, the techniques described herein may be implemented in a cloud computing environment. As discussed in more detail below in reference to at least FIGS. 1, 5, and 6, a computing device configured to query expertise may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

With reference now to FIG. 1, an example computing device can query expertise. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. An external computing device 120 may connect to the computing device 100 through the network 118. In some examples, external computing device 120 may be an external webserver 120. In some examples, external computing device 120 may be a cloud computing node.

The processor 102 may also be linked through the system interconnect 106 to a storage device 122 that can include a hard drive, an optical drive, a USB flash drive, an array of drives, or any combinations thereof. In some examples, the storage device may include a search engine 124, a social graph module 126, and a confidence module 128. In some examples, the query received by the search engine 124 can include an expertise. The search engine 124 can execute a document-oriented search based on a query in an index of documents to generate or output a set of document results. Each document can be associated with at least one potential expert. For example, a document can be a blog post, a social media post, a shared file, and the like. The search engine 124 can analyze the document results to produce a list of potential experts. The confidence module 128 can calculate an expertise score for each potential expert based on a content score and a metadata score for each potential expert. In some examples, the confidence module 128 can calculate the metadata score from tags, skills, and job titles of the potential experts stored in a data repository. In some examples, the confidence module 128 can calculate the content score based on content document types such as wikis, blogs, forums, files, and the like, the content document types to be gathered by parsing websites and stored in a data repository. The content score can also be based on associations of a potential expert with the content documents, such as being a commenter, author, or liker of the content document. In some examples, a combination of a document type and association can be given a predetermined amount of content score points. In some examples, the confidence module 128 can select a predetermined number of selected experts with expertise scores above a threshold from the list of potential experts and calculate an evidence diversity score for each selected expert. In some examples, the confidence module 128 can also calculate an evidence diversity score for each potential expert. The confidence module 128 can also calculate a confidence score for the selected experts or potential experts based on a diversity-constrained content score and a diversity-constrained metadata score. For example, the diversity constrained content score and the diversity-constrained metadata score can be based on the evidence diversity score. The content score and the metadata score for each selected expert or potential expert can be constrained by the evidence diversity score to generate the diversity-content score and the diversity-constrained metadata score. In some examples, the confidence score can also be based on a social score. The social graph module 126 can generate a graph of connections between the potential experts. In some examples, the social graph module 126 can generate a social graph based on a predetermined number of selected experts. The social graph module 126 can calculate a social score for each selected expert or potential expert using the graph.

In some examples, the confidence scores may be based on preconfigured thresholds. For example, the thresholds may be used to separate a low confidence score, a medium confidence score, and a high confidence score. The confidence scores can indicate a certainty of expertise for each selected expert or potential expert. In some embodiments, the search engine 124 can then send a list of experts with associated confidence scores to a client device. In some examples, the list of experts can be filtered to the potential experts or selected experts that have confidence scores above a threshold score. In some examples, the list of experts can be sorted by the expertise score of each potential expert or selected expert.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the search engine 124, social graph module 126, and confidence engine 128 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the search engine 124, social graph module 126, and confidence engine 128 can be implemented with logic, wherein the logic, as referred to herein, can include any suitable hardware (e.g., a processor, among others), software (e.g., an application, among others), firmware, or any suitable combination of hardware, software, and firmware.

Figure 2:
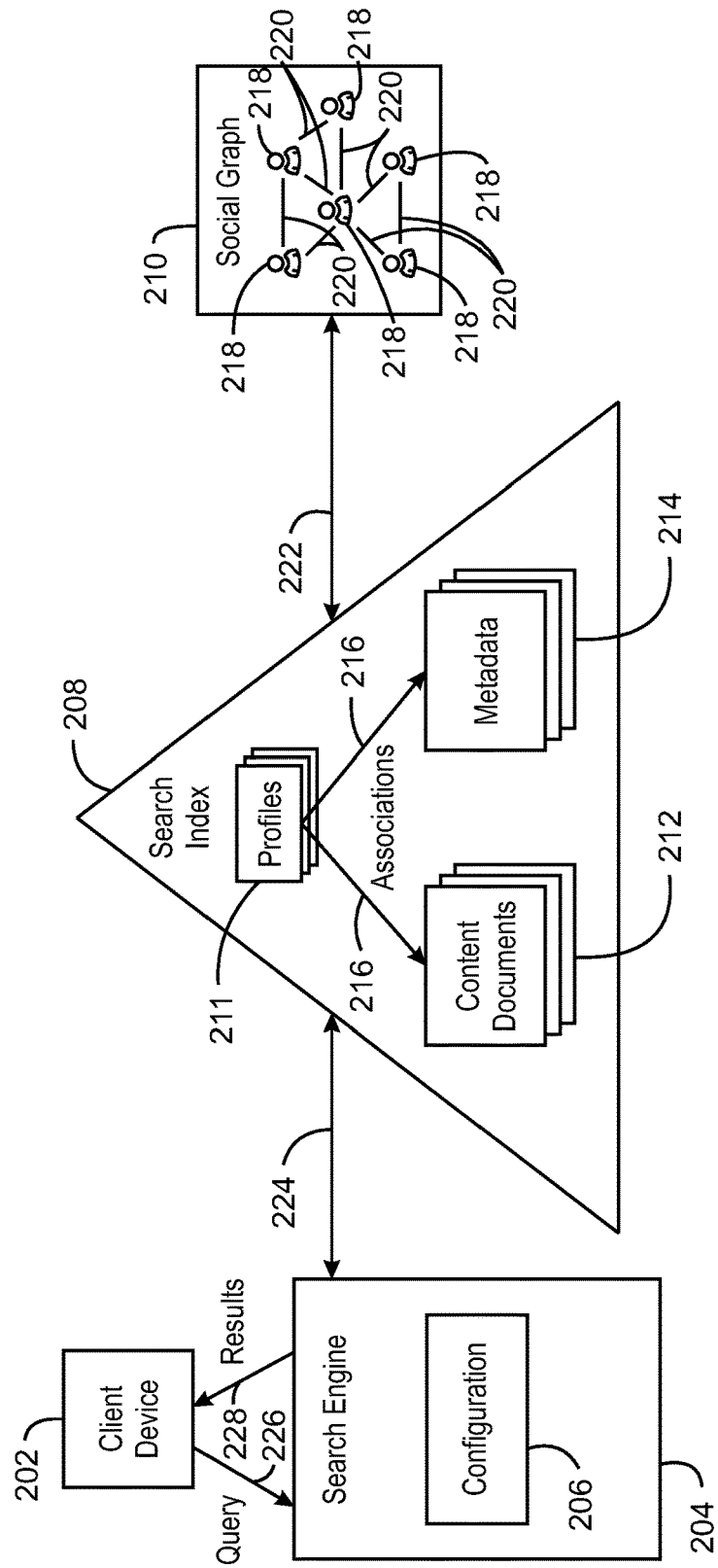
FIG. 2 is a block diagram of an example system for calculating confidence scores.

FIG. 2 is a block diagram of an example system for calculating confidence scores. The example system of FIG. 2 is generally referred to by the reference number 200.

In FIG. 2, the system 200 includes a client device 202. The system 200 also includes a search engine 204 with a search engine configuration 206, a search index 208, and a social graph 210. For example, the search engine, 204, search index 208 and social graph 110 can be stored in a storage device, such as storage device 122. The search index 208 includes expert profiles 211, content documents 212, and metadata 214. The expert profiles 211 can have associations 216 with one or more content documents 212 and metadata 214. The social graph 210 can include a plurality of potential experts 218 or selected experts 218 joined by social connections 220. The social graph 210 and the search engine 204 are communicatively coupled to the search index 208 via connection 222 and connection 224, respectively. The search engine 204 includes a configuration file 206. The client device 202 can also send a query 226 to the search engine 204 and receive a response including results 228.

As shown in FIG. 2, a query 226 can be sent from the client device 202 to the search engine 204. For example, the query 226 can include an expertise for which one or more potential experts 218 may exist. Based on the search engine configuration file 206, the search engine 204 can execute one or more searches on search index 208. In some examples, the search engine 204 can execute a document-oriented search of the content documents 212 in the search index 208. For example, the search can be based on a query 226 for cloud computing expertise, among others. In some examples, each content document 212 can be associated 216 with at least one potential expert 218 in the expert profiles 211. For example, at least one potential expert 218 may have created, modified, liked, or altered the content document 212 in some manner. In some examples, the search engine 204 can analyze the document results of the search to produce a list of potential experts. In some examples, the document results can include content documents 212 related to a particular expertise. In addition, the analysis can return one or more experts that are associated with the content documents 212. The results 228 of the query 226, such as the list of expert profiles 211 corresponding to potential experts, can then be ranked via expertise scores as described in greater detail below.

In some examples, the search engine 204 calculates an expertise score for the expert profiles 211 based on metadata 214 associated with the expert profiles 211. The expertise scores can be used to identify users that qualify as experts in an area of expertise specified by the query 226. In some embodiments, the metadata can include tags, skills or job titles associated with the potential expert profiles 211. In some examples, the search engine 204 calculates an expertise score based in part on the diversity of the content documents 212. For example, an expert associated with three types of documents for an area of expertise, such as blogs, wall posts, and articles, can receive a higher confidence score than an expert associated with reposting content or sharing content. In some examples, the diversity of the documents can be used as a constraint. A constraint, as referred to herein, can include any suitable characteristic that is used to limit a confidence score. For example, expertise scores may be allowed a higher rating or ranking if the expertise score is based on multiple types of documents or limited to a lower rating or ranking if the expertise score is based on one or two types of documents. In some examples, other dimensions can be used as constraints. In some examples, strength of the content associations can be used as a dimension. For example, having at least two strong associations such as being tagged in a document associated with an area of expertise or owning an online community related to an area of expertise can be used as a dimension for high confidence levels. In some examples, validity according to date can be used as a constraint. For example, a constraint for higher expertise scores can correspond to the number of documents associated with a user from a time period. In some examples, the search engine 204 also calculates the confidence score using social graph data. For example, the number of connections 220 between a given potential expert 218 and other potential experts 218 can be used to increase the confidence score for a well-connected potential expert. In some examples, a social graph 210 can be constructed for each query 226 of a particular area of expertise. The social graph 210 can then be used in calculating a confidence score for each profile 211 that has been selected as a potential expert in the area of expertise. The detailed calculation of a confidence score for each potential expert is discussed at greater length with reference to FIG. 3 below.

Still referring to FIG. 2, in some examples, response 228 includes a list of experts for a given expertise with a confidence score that exceeds a threshold value. In some examples, the confidence score along with content evidence such as content documents 212 for the confidence score can also be provided to client device 202 and displayed.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional dimensions, or additional indexes, etc.). For example, alternatively, or in addition to the diversity of evidence dimension, strength of the content associations and validity according to date can be used, among other dimensions.

Figure 3:
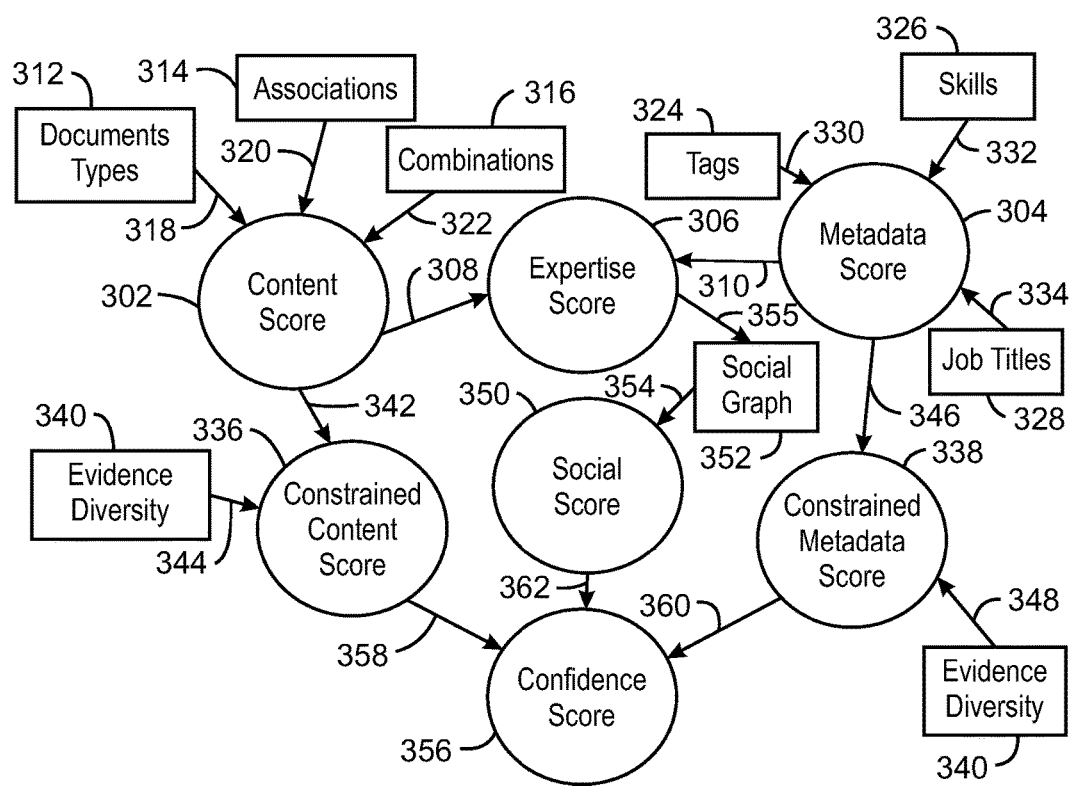
FIG. 3 is a block diagram of an example confidence score calculation.

FIG. 3 is a block diagram of an example confidence score calculation. The example system of FIG. 3 is generally referred to by the reference number 300.

In FIG. 3, the example confidence score calculation 300 includes a content score 302 and a metadata score 304 that are used to calculated an expertise score as indicated by arrows 308 and 310, respectively. Content score 302 can be based on content types 312, associations 314, and/or combinations 316 of different content types and associations as shown by arrows 318, 320, and 322, respectively. The metadata score 304, moreover, can be based on tags 324, skills 326, and job titles 328 as indicated by arrows 330, 332, and 334, respectively. The calculation of the confidence score 356 is based on a constrained content score 336 and a constrained metadata score 338. The constrained content score 336 can be based on the content score 302 and an evidence diversity 340 as indicated by arrows 342 and 344, respectively. The constrained metadata score is based on the metadata score 304 and the evidence diversity 340 as indicated by arrows 346 and 348, respectively. A social score 350 is based on a social graph 352 as indicated by an arrow 354. The social graph 352 is based on the expertise score 306 as indicated by arrow 355. The confidence score 356 is based on the constrained content score 336, the constrained metadata score 338 and the social score 350, as indicated by arrows 358, 360 and 362, respectively.

As shown in FIG. 3, a content score 302 can be calculated based on a number of content documents. For example, content documents can include user-created comments, shared information or documents, crowd-sourced documents, and the like. In some examples, document types can include wikis, blogs, and forums, and the like. Moreover, each content document can have one or more associations 314 with a potential expert. For example, a potential expert can be an author, commenter, and/or a liker, of a content document, among other possible associations 314. In some examples, combinations 316 of document types 312 and associations 314 can be given a predetermined weight. For example, a potential expert can be given a particular amount of content score points for commenting in a forum on a particular subject of expertise.

The metadata score 304 can likewise be calculated based on tags, skills, and job titles, among other types of metadata. In some examples, the metadata score 304 for a potential expert can be affected by the amount of associated metadata as well as the weight of the metadata. For example, job titles may receive more weight than tags. Each characteristic that is relevant to an expertise of the search query can contribute to an expert's metadata score.

The content score 302 and the metadata score 304 can be used to calculate an expertise score 306 for a number of expert profiles. In some examples, a social graph 352 can be created from a set of potential experts based on the expertise score 306 of each potential expert. For example, a predetermined number of potential experts, such as the first 1000 potential experts, of a particular expertise with higher expertise scores 306 can be used to create the social graph 352. The social graph 352 can be used to calculate a social score 350 based on the number of social connections a selected expert has with other selected experts in the social graph 352. For example, the social score 350 can be calculated according to the detailed example given in FIG. 4 below.

In some embodiments, the content score 302 can be combined with an evidence diversity score 340 to produce a constrained content score 336. An evidence diversity score 340 is a number or rating that can indicate the number of different types of evidence or associations to this evidence that a confidence score 356 represents. In some examples, the diversity constraint can be based on threshold numbers of content types and content associations, or combinations. For example, a threshold of three different content types and four different combinations of content types and associations can be used for a high evidence diversity score 340.

In some examples, the evidence diversity score 340 can be used to constrain scores based on other dimensions. For example, the evidence diversity score 340 can be used to constrain the content score 302 and the metadata score 304 based on the number sources each score represents. A high score with a low evidence diversity score 340 may be limited to a low score corresponding to the evidence diversity score 340. Likewise, the metadata score 304 can be combined with the evidence diversity score 340 to produce a constrained metadata score 338. The confidence score 356 can then be calculated from the constrained content score 336, the constrained metadata score 338 and the social score 350. In some examples, the confidence score 356 can be given a ranking of low, medium or high confidence. For example, a potential expert with a high constrained content score 336, a high constrained metadata score 338 and a high social score 350 can be given a high ranking for the confidence score 356.

It is to be understood that the block diagram of FIG. 3 is not intended to indicate that the system 300 is to include all of the components shown in FIG. 3. Rather, the confidence score 300 can include fewer or additional components not illustrated in FIG. 3 (e.g., additional content documents, or additional metadata, additional dimensions, etc.).

Figure 4:
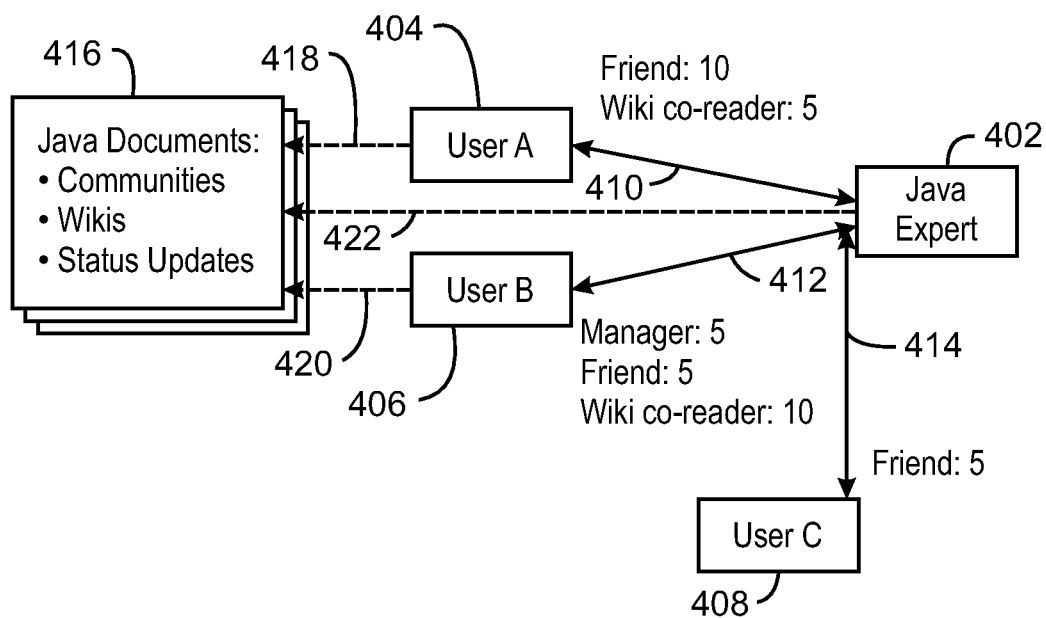
FIG. 4 is a block diagram of an example social score calculation according to embodiments described herein.

FIG. 4 is a block diagram of an example social score calculation according to embodiments described herein. The example social graph of FIG. 4 is generally referred to by the reference number 400.

In FIG. 4, the example social score calculation 400 includes a selected expert 402 for which a social score 400 is to be calculated and three other selected experts 404, 406, and 408, that are associated with selected expert 402 as indicated by arrows 410, 412 and 414, respectively. Selected experts 402, 404 and 406 are associated with one or more documents in document store 416 as indicated by arrows 418, 420, and 422, respectively. In some examples, selected experts 402, 404, 406, and 408 can also be potential experts.

As shown in FIG. 4, the selected expert 402 receives points towards a social score for each selected expert 404, 406, 408 of a particular area of expertise. For example, the selected experts 402, 404, 406, and 408 may be among the top 1000 practicing individuals in a particular expertise as demonstrated by their expertise scores. In some examples, the selected experts 402, 404, 406, 408 may have scored a high expertise score with regard to a particular expertise. For example, the selected experts 402, 404, 406, 408 may be among a predetermined number of selected experts that were given a higher expertise score with regard to an expertise such as Java programming, among others. The selected experts 402, 404 and 406 are each associated with one or more Java documents that can serve as content evidence of Java expertise. For example, the documents can include blogs, crowd sourced documents, and status updates, among others. In some examples, the selected expert 402 can receive a predetermined number of social points for being connected to selected experts 404, 406, and 408. For example, selected expert 402 may be a friend of selected expert 404 that also is a Java wiki co-reader. In some examples, the selected expert 402 can receive a predetermined number of points for having a Java friend, and another predetermined number of points because the Java friend is also a Java wiki co-reader. For example, selected expert 406 may be a Java project manager, friend and Java wiki co-reader of selected expert 402. The selected expert can receive a predetermined number of points for being connected to a Java manager, another predetermined number points for being connected to a Java friend, and another predetermined number of points for being connected to a Java co-reader. In some examples, the number of social score points received for each connection can be configurable in a configuration file.

In some examples, a selected expert 408 may not be associated with any documents of the document store 416. For example, the selected expert 408 may be a friend of selected expert 402 with a metadata score indicating an association with the area of expertise. In some examples, the selected expert 402 can also receive an extra predetermined number of points for being connected with selected expert 408.

It is to be understood that the block diagram of FIG. 4 is not intended to indicate that the social graph 400 is to include all of the components shown in FIG. 4. Rather, the system 200 can include fewer or additional components not illustrated in FIG. 4 (e.g., additional selected experts, or additional social relationships, etc.).

Figure 5:
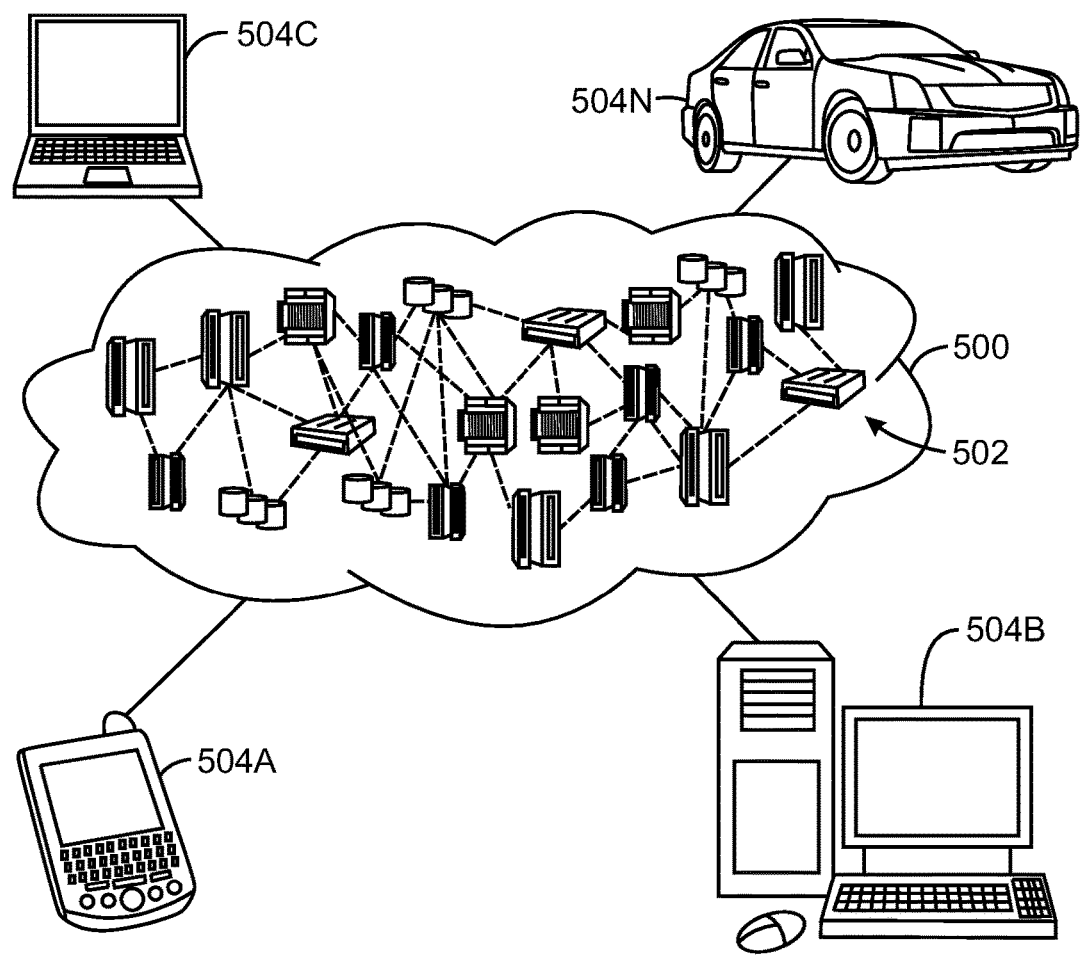
FIG. 5 is an example cloud computing environment according to embodiments described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
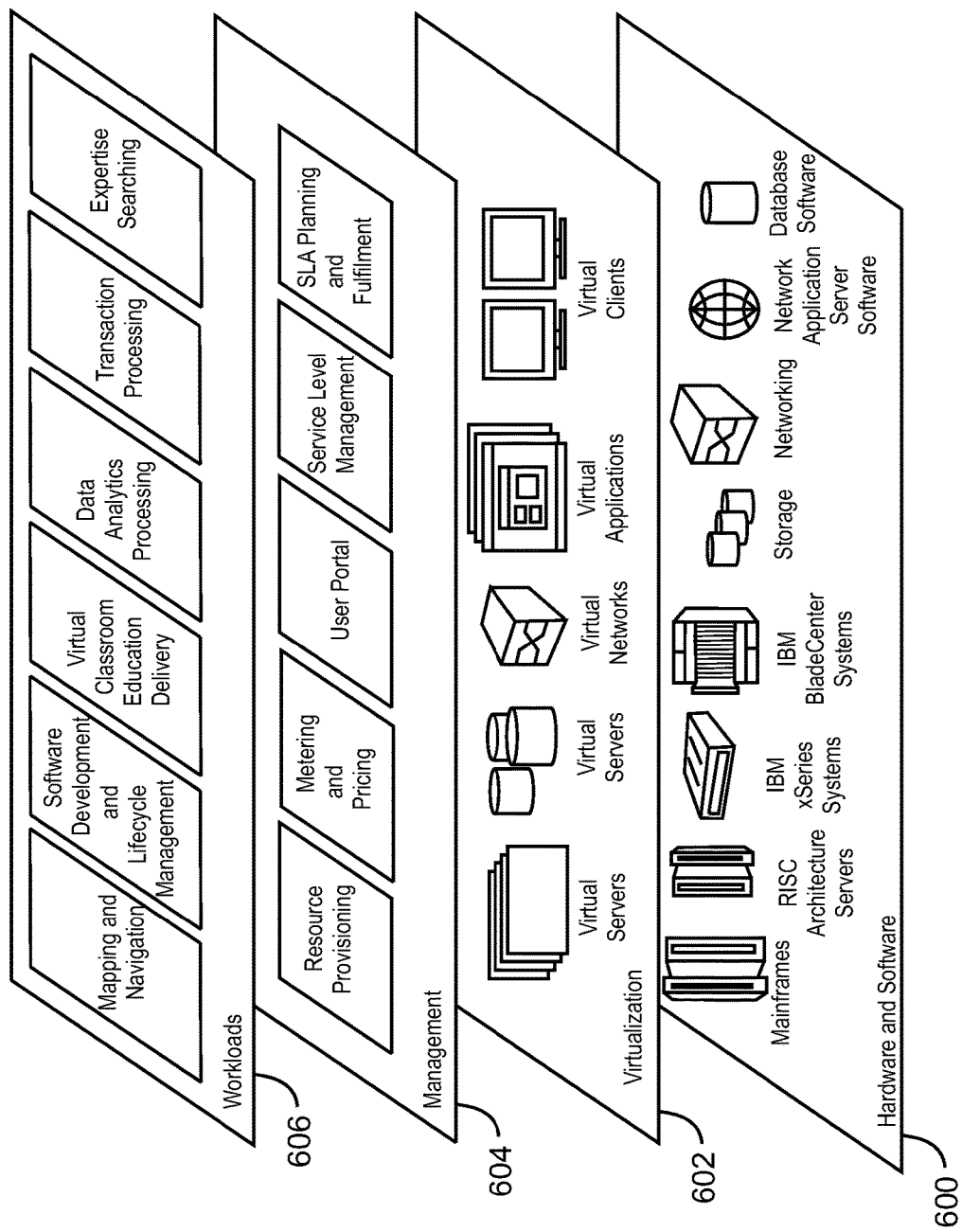
FIG. 6 is example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and expertise searching.

Figure 7:
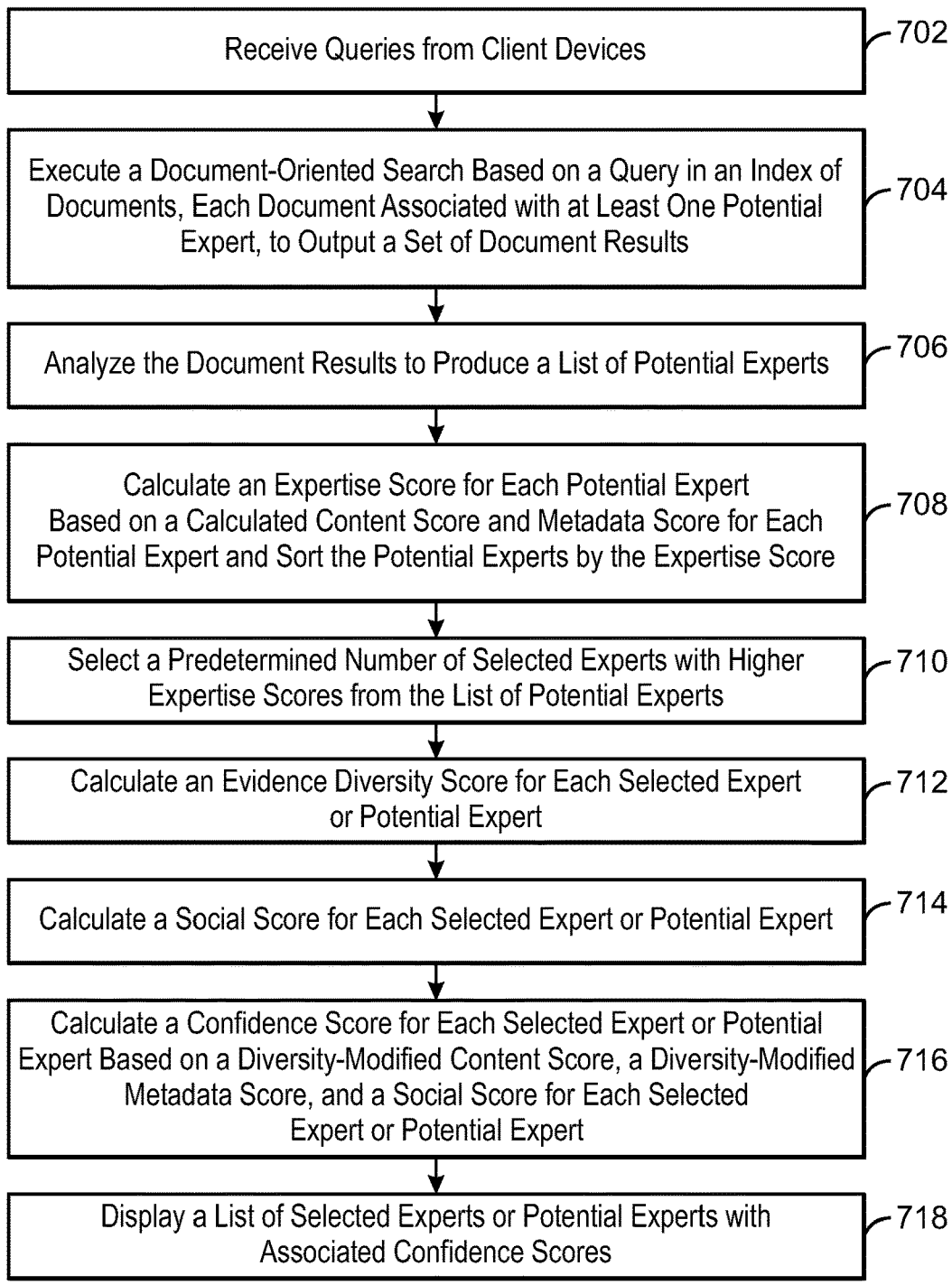
FIG. 7 is a process flow diagram of an example method that can calculate confidence scores.

FIG. 7 is a process flow diagram of an example method that can calculate confidence scores. The method 700 can be implemented with any suitable computing device, such as the computing device 100 of FIG. 1 and is described with reference to the system 200 of FIG. 2.

At block 702, the search engine 204 receives queries from client devices 202. In some embodiments, the queries can include particular areas of expertise. For example, the area of expertise can be related to any suitable technical area, such as Platform as a Service (PAAS) expertise, among others, or any other non-technical area of expertise.

At block 704, the search engine 204 executes a document-oriented search based on the query 226 in an index 208 of content documents 212, each content document 212 associated with at least one potential expert 218, to output a set of document results. For example, the search engine 204 can search through a search index 208 for content documents 212 relating to the particular expertise. The search can be performed using search engine configuration file 206.

At block 706, the search engine analyzes the document results to produce a list of potential experts. For example, the search engine 204 can traverse over the content documents 212 returned by the search of block 704 and collect the names of potential experts associated with the content documents 212. Each potential expert receives a content score based on associations with one or more documents. For example, the content score can be based on the number of associations, the relevance of each document to the expertise, and the nature of the association, or any combination thereof. In some examples, the content documents 212 may also have metadata. The metadata can be profile related information such as tags, skills, and job title, etc. In some examples, each user receives a metadata score based on the number, relevance, and nature of the metadata as the metadata relates to the particular expertise.

At block 708, the search engine can calculate an expertise score for each potential expert 218 based on a calculated content score and metadata score for each potential expert and sort the potential experts by the expertise score. For example, the content score and metadata score can be summed together to produce an expertise score. In some examples, the expertise score can include three confidence levels based on two thresholds. For example, the confidence levels can be high, medium, and low, the medium and high confidence levels each having a threshold. In some examples, if the expertise score exceeds a threshold, then the corresponding confidence level is met. In some examples, the threshold values are configurable and reflect an amount and relevance of evidence associated with a particular potential expert.

At block 710, the search engine 204 selects a predetermined number of selected experts with higher expertise scores from the list of potential experts. In some examples, the predetermined number of selected experts is configurable via a configuration file 206. Additional dimensions can then be added to the confidence scores for each selected expert. For example, calculation of the confidence score may include combining the metadata scores and content scores with evidence diversity scores to produce constrained content scores and constrained metadata scores, and combining the constrained scores with a social score based on social graph 210 connections 220 to produce a confidence score as discussed in greater detail below.

At block 712, the search engine 204 calculates an evidence diversity score for each selected expert or potential expert. In some examples, the evidence diversity score is based on the quality and types of the content documents. Quality and variety of content documents can be determined using the configuration file 206. The configuration file 206 can include types of content documents to be treated as different types and different types of associations, and combinations thereof with corresponding weights for scoring. For example, being tagged as an expert and writing blog posts can produce a higher diversity score. By contrast, tagging other people as experts or posting on a wall may produce a lower diversity score. In some examples, the diversity score can be used as an additional constraint for medium and high confidence score ratings. A threshold level of diversity score can be included in a diversity-constrained content score and a diversity-constrained metadata score. For example, a diversity-constrained content score with a high content score but a low diversity score may result in a low diversity-constrained content score.

At block 714, the search engine 204 calculates a social score for each selected expert or potential expert. The social score can be calculated from a social graph 210 based on the number of connected experts 218 to a particular expert 218. In some examples, the social graph 210 is composed of selected experts based on higher expertise score. In some examples, the social graph is composed of all potential experts. In some examples, a social graph 210 is computed in the context of the query 226. For example, an edge in the social graph 210 can connect two experts 218 that share an association with the same content document if the content document is relevant to the query 226. In some examples, the edges of the social graph 210 can be created during the initial traversing over content documents returned for the query 226. In some examples, context-free relations can also be included in the social graph 210. Context-free relations, as used herein, refer to social relations that are unrelated to the context of a query or content. Context-free relations can include, for example, a manager-employee relationship or a friendship. In some examples, context-free relations can also be included in the social graph 210 and included in the social score. In some examples, the social score is also divided into thresholds. For example, the social score can be split into three levels, high, medium, and low, based upon two threshold values.

At block 716, the search engine 204 calculates a confidence score for the selected experts based on at least one of the diversity-constrained content score, the diversity-constrained metadata score, and the social score for each selected expert or potential expert. In some examples, the confidence score is calculated by combining the diversity-constrained content score, the diversity-constrained metadata score and the social score following a configurable set of rules. The configurable set of rules can include the amount of points received for each confidence per dimension. For example, a selected expert 218 can receive a point for having a low confidence level, two points for having a medium confidence level, and three points for having a high confidence level for any of the three scores. The diversity-constrained content score, the diversity-constrained metadata score and the social score can be summed together to produce a confidence score. Thus, the total points may range, in some examples, from three to nine. If the selected expert or potential expert 218 receives eight or more total points, then the expert 218 receives a high confidence score. If the selected or potential expert 218 receives five to seven points, then the expert receives a medium confidence score. If the selected expert or potential expert 218 receives four points or less, then the expert 218 receives a low confidence score. In some examples, the weights and thresholds for scoring can be configured in a search engine configuration file 206.

At block 718, the client device 202 displays a list of selected experts or potential experts with associated confidence scores. In some examples, the search engine 204 can return a list of results 228, such as a list of experts, expertise scores, and evidence documents in addition to the confidence scores associated with each expertise score.

The process flow diagram of FIG. 7 is not intended to indicate that the operations of the method 700 are to be executed in any particular order, or that all of the operations of the method 700 are to be included in every case. For example, block 710 may be skipped and blocks 712-718 may be applied to all the potential experts rather than a subset of selected experts. Furthermore, the confidence score may be calculated using any one or combination of the diversity-modified content score, the diversity-modified metadata score, and the social score. Additionally, the method 700 can include any suitable number of additional operations.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
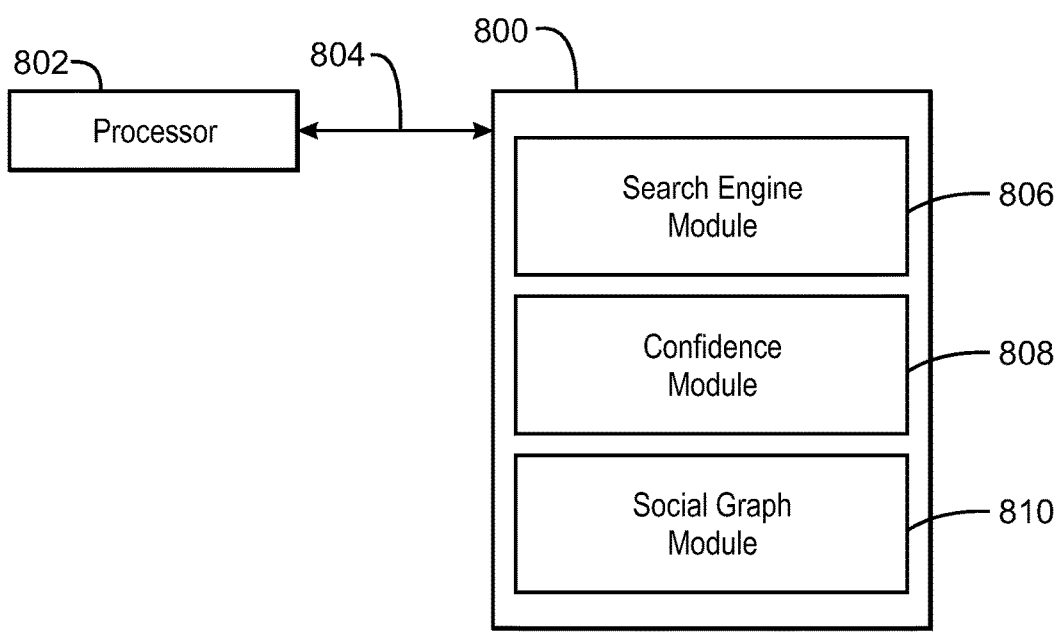
FIG. 8 is an example tangible, non-transitory computer-readable medium that can calculate confidence scores.

Referring now to FIG. 8, a block diagram is depicted of an example tangible, non-transitory computer-readable medium 800 that can calculate confidence scores. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the current method.

The various software components discussed herein may be stored on the tangible, non-transitory, computer-readable medium 800, as indicated in FIG. 8. For example, a search engine module 806 includes code to execute a document-oriented search based on a query in an index of documents each associated with at least one potential expert, to output a set of document results. The search engine module 806 also includes code to analyze the document results to produce a list of potential experts. A confidence module 808 includes code to calculate an expertise score for each potential expert based on a calculated content score and metadata score for each potential expert and sorting the potential experts by the expertise score. The search engine module 806 includes code to select a predetermined number of selected experts with higher expertise scores from the list of potential experts and return a list of selected experts. The confidence module 808 includes code to calculate an evidence diversity score for each selected expert. A social graph module 810 includes code to generate a social graph and calculate a social score from the social graph. In some examples, the social graph module 810 can generate the social graph based on the list of selected experts. The confidence module 808 further includes code to calculate a confidence score for the selected experts based on a diversity-constrained content score, a diversity-constrained metadata score, and/or a social score. The search engine module 806 includes code to filter the selected experts or the potential experts by the confidence score.

In some examples, the query can include an expertise, the confidence score to indicate a relative level of the expertise for each selected expert. In some examples, the confidence module 808 can calculate the content score based on different content types including wikis, blogs, and status updates, and different associations such as author, commenter, and liker, stored in a data repository. In some examples, the confidence module 808 can calculate the metadata score from tags, skills, and job titles of the potential experts stored in a data repository. In some examples, the evidence diversity score includes a predetermined threshold number of different content types, content associations, metadata types, or any combinations thereof. In some examples, the social score is to be based on a number of connections between a selected expert and other selected experts. In some examples, the social score is to be based on a number of connections between a potential expert and other potential experts. For example, the social graph module 810 can use a social graph to analyze connections between selected experts or potential experts.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   executing, via a processor, a document-oriented search based on a query in an index of documents to generate a set of document results, each document in the set of document results is associated with at least one potential expert;
   analyzing, via the processor, the document results to produce a list of potential experts;
   calculating, via the processor, an expertise score for each potential expert based on a calculated content score and metadata score for each potential expert;
   calculating, via the processor, an evidence diversity score for each potential expert;
   calculating, via the processor, a confidence score for each potential expert based on a diversity-constrained content score and a diversity-constrained metadata score for each potential expert, wherein:
   the diversity-constrained content score is calculated using the evidence diversity score, comprising a predetermined threshold number of different activities associated with the potential expert, and the content score for the potential expert;
   the diversity-constrained metadata score is calculated using the evidence diversity score and the metadata score for the potential expert;
   the content score is calculated based on a number of different content document types and associations associated with the potential expert, the content document types and associations are gathered by parsing websites and stored in a data repository;
   the metadata score is calculated based on profile-related information associated with the potential expert; and
   the confidence score is further calculated based on a social score, wherein the processor is configured to generate a representation of connections between the potential experts, the social score for each potential expert is calculated using the representation of connections and based on a number of connections to other potential experts; and
   sending a list of potential experts whose confidence scores are above a confidence score threshold to a client device.

2. The method of claim 1, further comprising:
   selecting, via the processor, a predetermined number of potential experts whose expertise scores meeting a threshold expertise score from the list of potential experts;
   calculating, via the processor, the evidence diversity score for each selected expert; and
   calculating, via the processor, a confidence score for each selected expert using the evidence diversity score for each selected expert.

3. The method of claim 2, further comprising sorting the list of potential experts by the expertise scores, wherein the predetermined number of selected experts being selected from the sorted list of potential experts.

4. The method of claim 1, further comprising calculating the diversity-constrained content score comprising constraining the content score based on the evidence diversity score and calculating the diversity-constrained metadata score comprising constraining the metadata score based on the evidence diversity score.

5. The method of claim 1, wherein the confidence scores are calculated based on preconfigured thresholds.

6. The method of claim 1, wherein the query indicates an expertise, and the confidence score is used to indicate a level of certainty in the expertise for each potential expert.

7. The method of claim 1, wherein the list of potential experts is filtered according to the confidence scores and sorted by the expertise scores.

* * * * *